April 12, 1927.  E. A. NELSON  1,624,501
METHOD OF WELDING
Filed March 17, 1926

Inventor
Emil A. Nelson
By
Hug Harness
Attorney

Patented Apr. 12, 1927.

1,624,501

UNITED STATES PATENT OFFICE.

EMIL A. NELSON, OF DETROIT, MICHIGAN.

METHOD OF WELDING.

Application filed March 17, 1926. Serial No. 95,179.

It is the primary object of my invention to provide an efficient method of butt welding parts together, my method being applicable to any number of different objects, but being particularly applicable to the welding of vehicle wheel spokes to wheel rims. Broadly speaking, my invention contemplates the heating of two parts to be welded together, the ends of said parts being cut on an angle and so disposed relative to each other that upon rotation of one of the parts or other movement of it toward the other part, contact of the two ends will be made, the initial contact being at a point slightly off the center line of the two parts to be welded, and the parts being brought into centered relation by continued rotation of one of the parts, so as to effect a pressure necessary in completing the weld.

With the above and other objects in view, my invention consists in the methods described in the following specification, claimed in my claim and shown in the accompanying drawing, in which:

I have shown a wheel hub 5 having metallic spokes 6 extending therefrom. Surrounding the hub 5 is a wheel rim 7 having spaced lugs 8 projecting therefrom. The faces of the lugs 8 are diagonally extended as at 9 and the ends of the spokes 6 are correspondingly diagonally extended as at 10.

Figure 1:
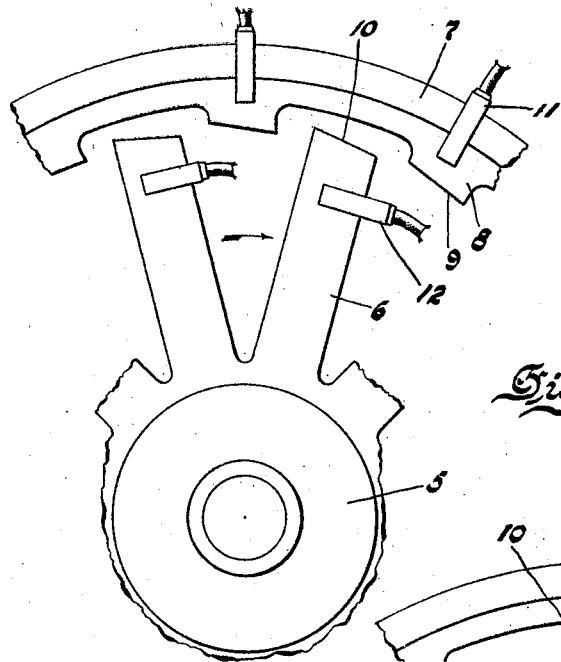
Fig. 1 is an elevation, certain parts being broken away, showing a wheel hub and spokes together with a wheel rim to which the spokes are to be welded.

In the practice of my invention, the lugs 9 may be clamped between electrodes 11 and the ends of the spokes 10 clamped between electrodes 12. The electrodes are connected in the usual manner to sources of electrical energy so that the ends of the spokes 6 and the lugs 8 may be heated to a welding heat. The hub 5 may be positioned in any suitable fixture adapted to rotate it in the direction indicated by the arrow in Fig. 1, such rotation bringing the ends of the spokes 6 into contact with the ends of the lugs 8, as shown in Fig. 2 of the drawing.

Figure 2:
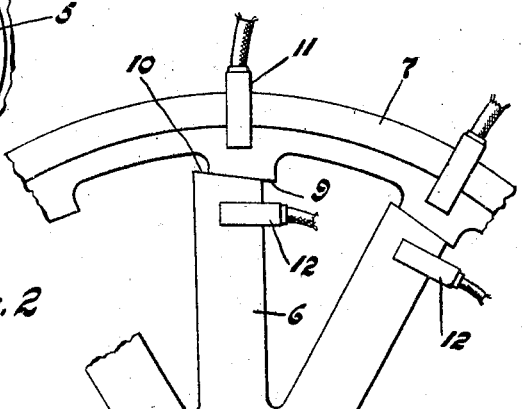
Fig. 2 is a similar view showing the same parts at the point of first contact of the parts to be welded together.
Figure 3:
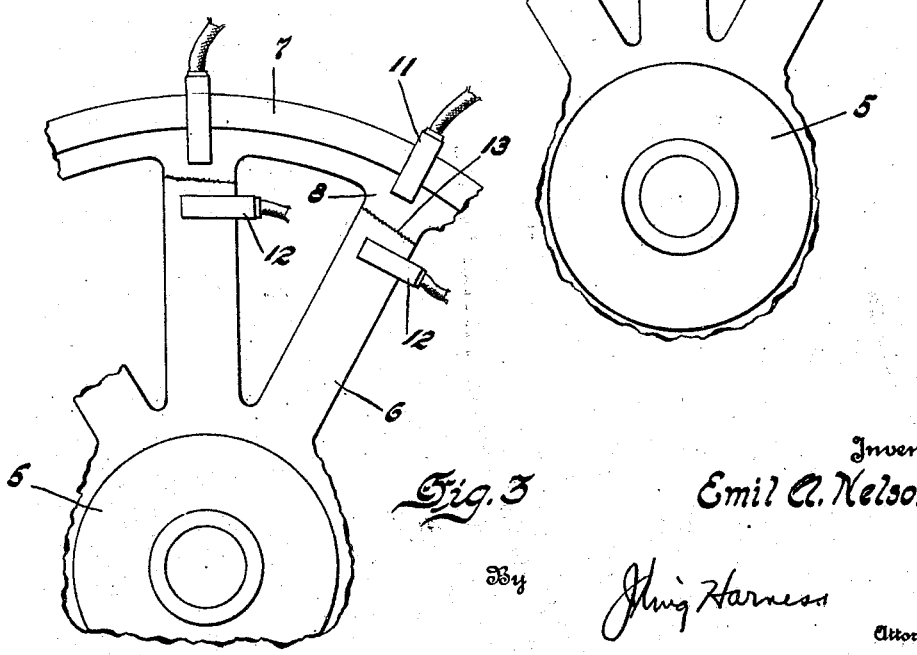
Fig. 3 is a similar view showing the finished weld.

It will be noted that the initial contact of the parts to be welded is such that they are in disalignment as shown in Fig. 2. By continued rotation of the hub 5 the spokes 6 and the lugs 8 may be brought into aligned position. It will be evident that the bringing of the two ends into alignment necessitates a pressure upon the contacting parts, which pressure will be sufficient for welding purposes so that no direct or extraneous pressure will need to be brought to bear on the parts. The customary flash 13 will be formed at the point of weld, which flash will be removed by machining or otherwise.

I desire it to be understood that either the hub 5 or the rim 7 may be rotated in the practicing of my invention, and that the method of welding herein described is not to be limited to the welding of wheel spokes to a rim, but is applicable to the welding of any two parts together.

It will be apparent, however, that the invention is particularly applicable to the welding of wheel spokes to a wheel rim for the reason that the various spokes may all be welded to the rim at the same time, and in a simple manner. It will further be apparent that when the heat contained in the parts being welded is dissipated a tendency to contract will be apparent in the spokes of the wheel so as to place them under tension.

It will be obvious that various changes may be made in the practice of the methods herein disclosed as well as in the objects to which the method is applied without departing from the spirit of my invention, and it is my intention to cover by my claim such changes as may be reasonably included within the scope thereof.

What I claim is:

The method of welding a plurality of wheel spokes to a wheel rim which consists of providing lugs on the rim with diagonal faces, providing a spoke and hub assembly, the spokes rigid with the hub, and providing the ends of the spokes with diagonal faces, providing the spokes and lugs of such length that when one of the units is rotated to align the spokes and lugs the contacting diagonal faces as they come together will slide upon each other under pressure due to the resulting wedging action, and heating the faces of the lugs and spokes and rotating them relative to each other into alignment.

EMIL A. NELSON.